United States Patent
Jacobsen

(10) Patent No.: US 9,261,074 B2
(45) Date of Patent: Feb. 16, 2016

(54) VARIABLE BOLT PARAMETERS FOR A WIND TURBINE ROTOR BLADE

(71) Applicant: General Electric Company, Schenectady, NY (US)

(72) Inventor: Eric Morgan Jacobsen, Greenville, SC (US)

(73) Assignee: General Electric Company, Schenectady, NY (US)

( * ) Notice: Subject to any disclaimer, the term of this patent is extended or adjusted under 35 U.S.C. 154(b) by 544 days.

(21) Appl. No.: 13/679,126

(22) Filed: Nov. 16, 2012

(65) Prior Publication Data

US 2014/0140850 A1    May 22, 2014

(51) Int. Cl.
*F03D 11/00* (2006.01)
*F03D 1/06* (2006.01)

(52) U.S. Cl.
CPC ............ *F03D 1/0658* (2013.01); *F03D 1/0675* (2013.01); *F03D 1/0691* (2013.01); *Y02E 10/721* (2013.01)

(58) Field of Classification Search
CPC .... F03D 1/0675; F03D 1/0691; F03D 1/0658
USPC .......................................................... 416/428
See application file for complete search history.

(56) References Cited

U.S. PATENT DOCUMENTS

| | | | | |
|---|---|---|---|---|
| 6,663,314 | B2 * | 12/2003 | Bequet | 403/408.1 |
| 7,517,194 | B2 * | 4/2009 | Doorenspleet et al. | 416/204 R |
| 8,025,485 | B2 * | 9/2011 | Jacobsen | 416/204 A |
| 8,591,187 | B2 * | 11/2013 | Bagepalli et al. | 416/1 |
| 8,888,462 | B2 * | 11/2014 | Klein | 416/225 |

* cited by examiner

*Primary Examiner* — Ninh H Nguyen
(74) *Attorney, Agent, or Firm* — Dority & Manning, P.A.

(57) ABSTRACT

A rotor blade for a wind turbine is disclosed. The rotor blade may include a body extending lengthwise between a blade root and a blade tip. The body may include a pressure side and a suction side extending between a leading edge and a trailing edge. In addition, the rotor blade may include a plurality of bolts extending from the blade root. A bolt parameter of the bolts may be varied for at least two of the bolts based on the loads transmitted through the blade root.

14 Claims, 7 Drawing Sheets

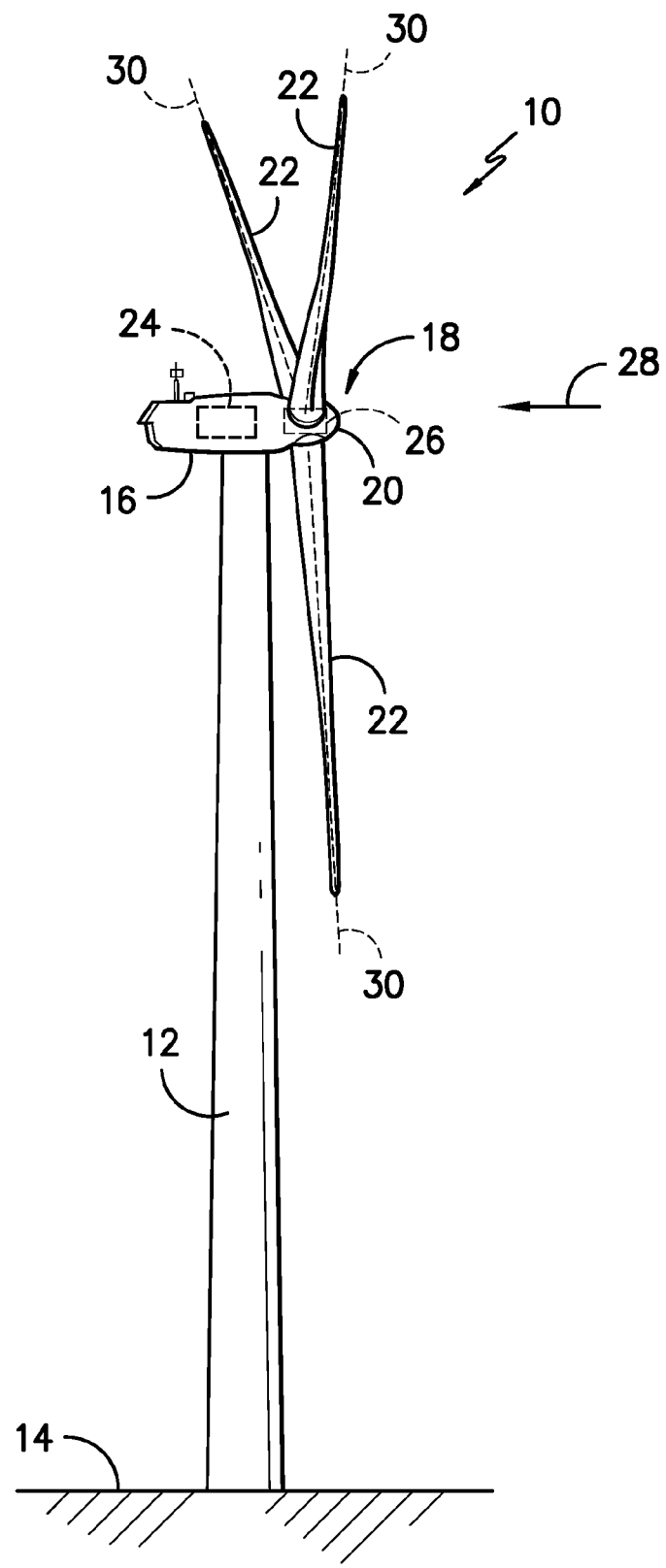
FIG. -1-

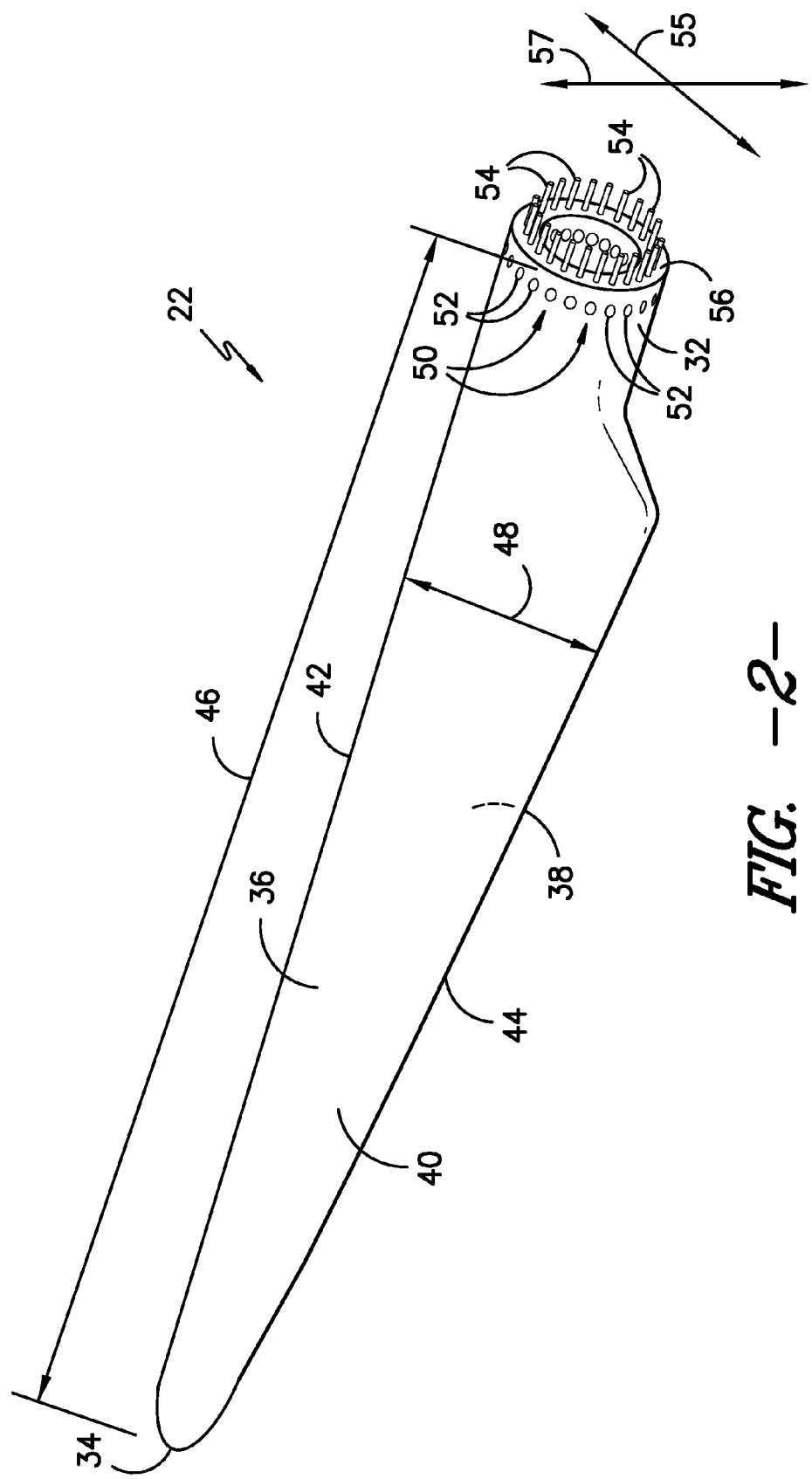
FIG. -2-

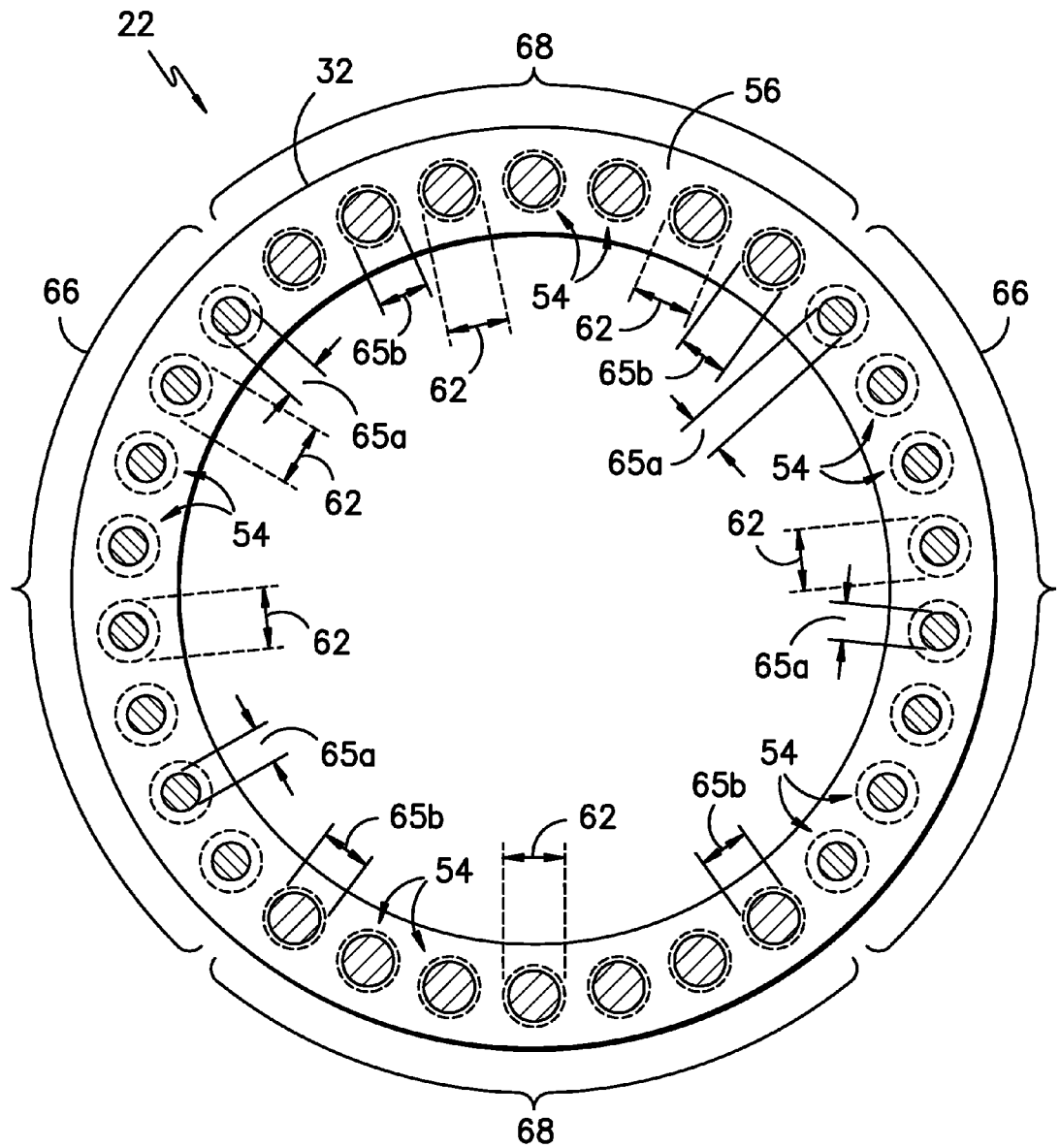
FIG. —3—

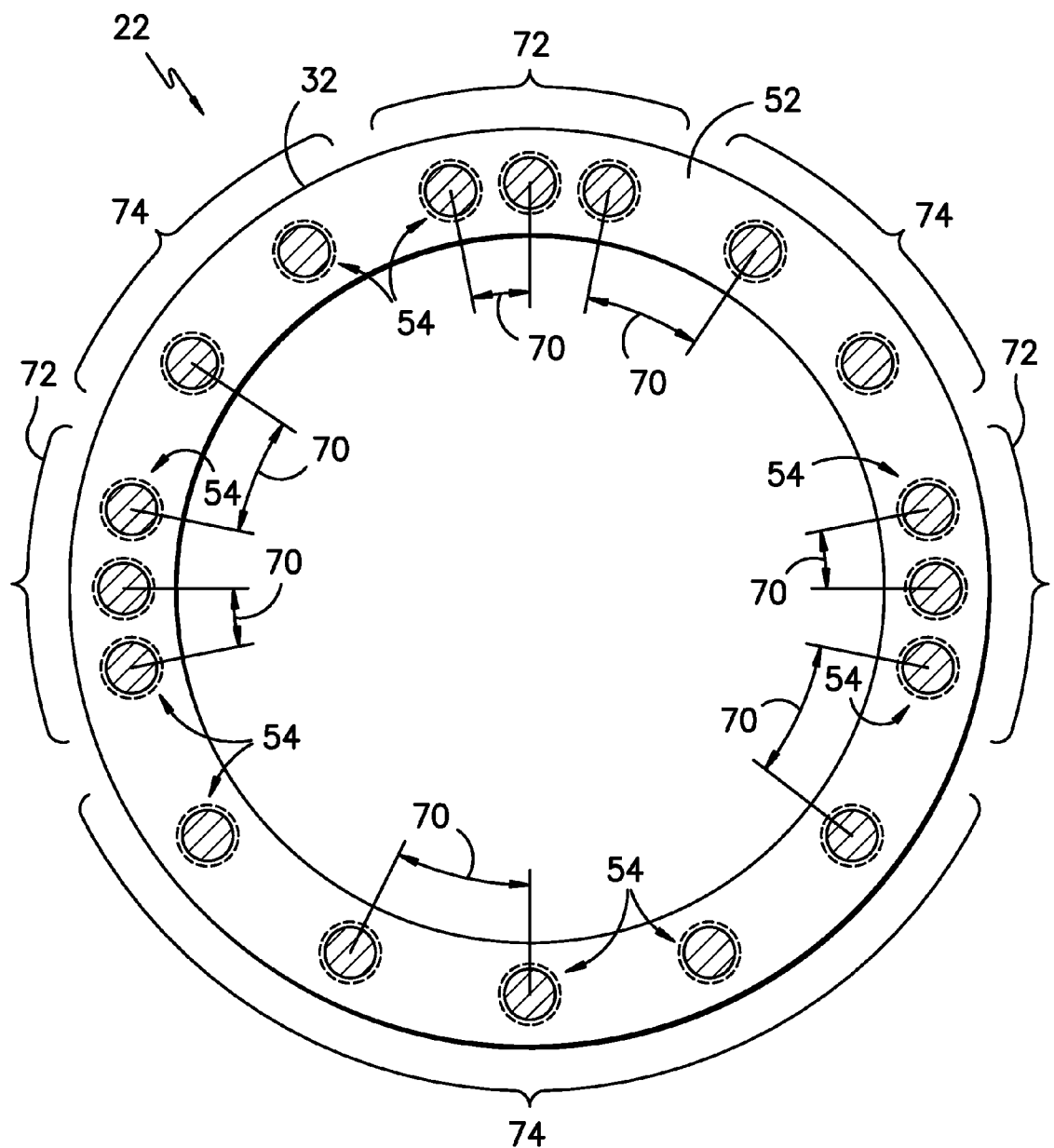
FIG. —4—

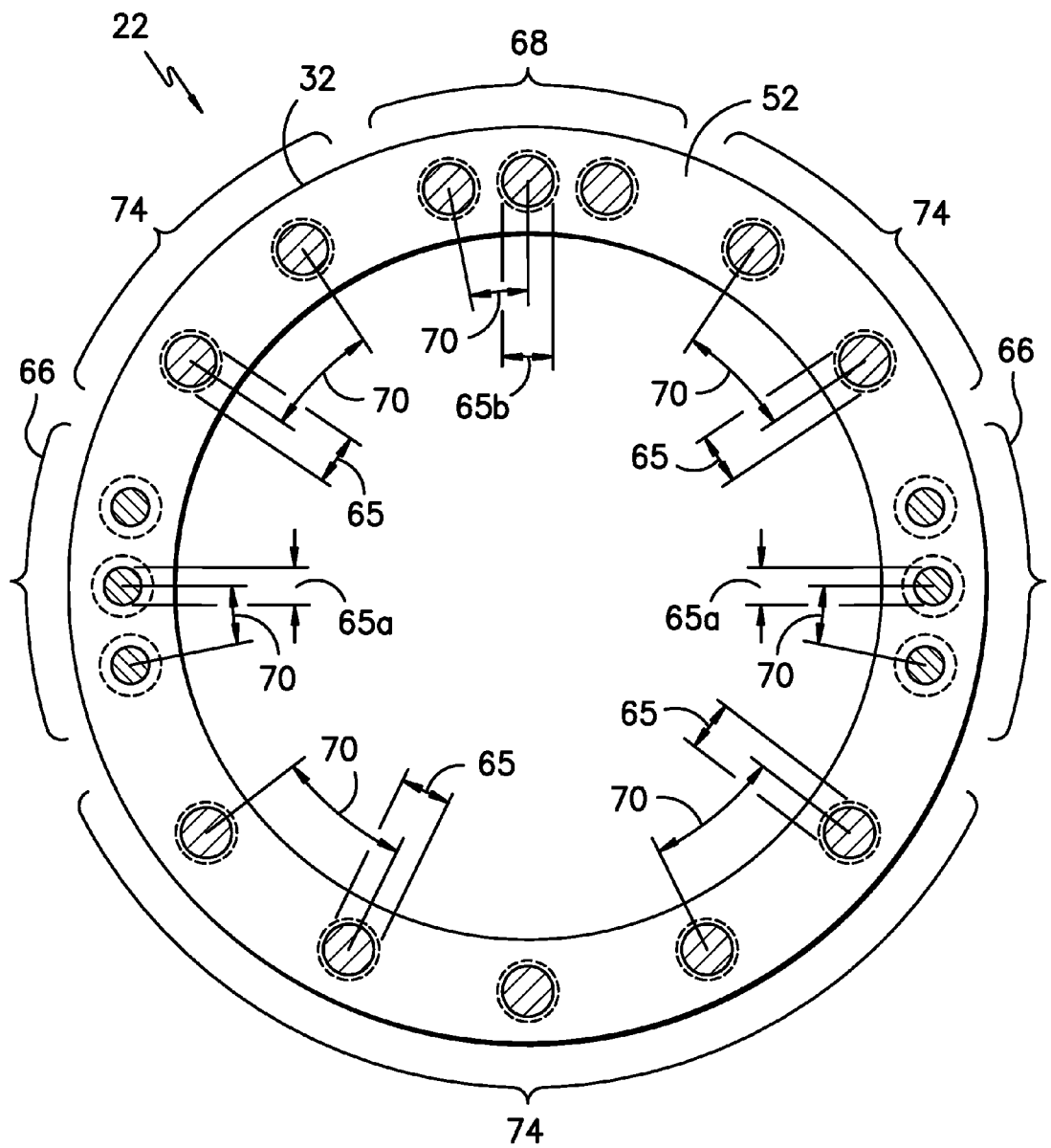
FIG. -5-

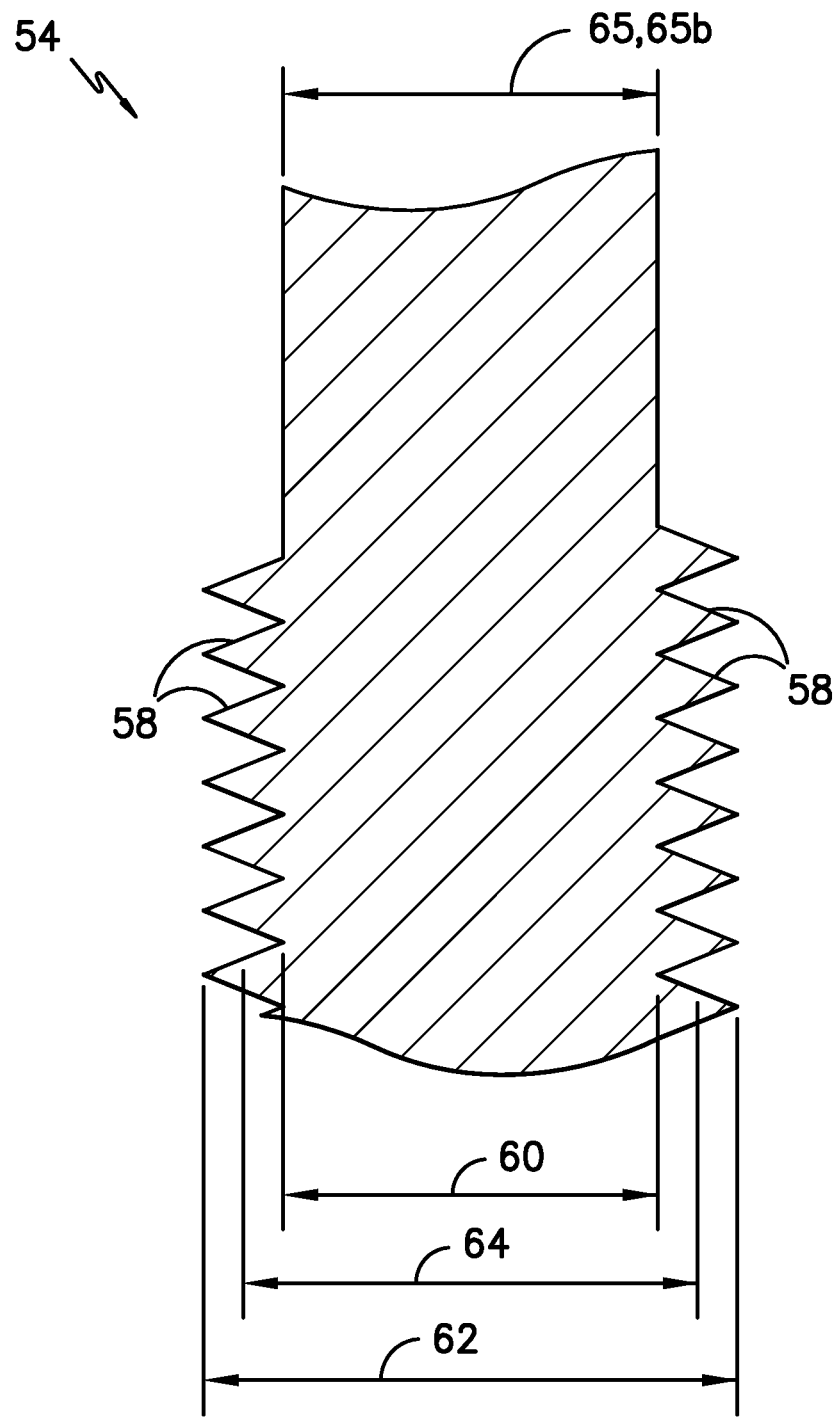
FIG. —6—

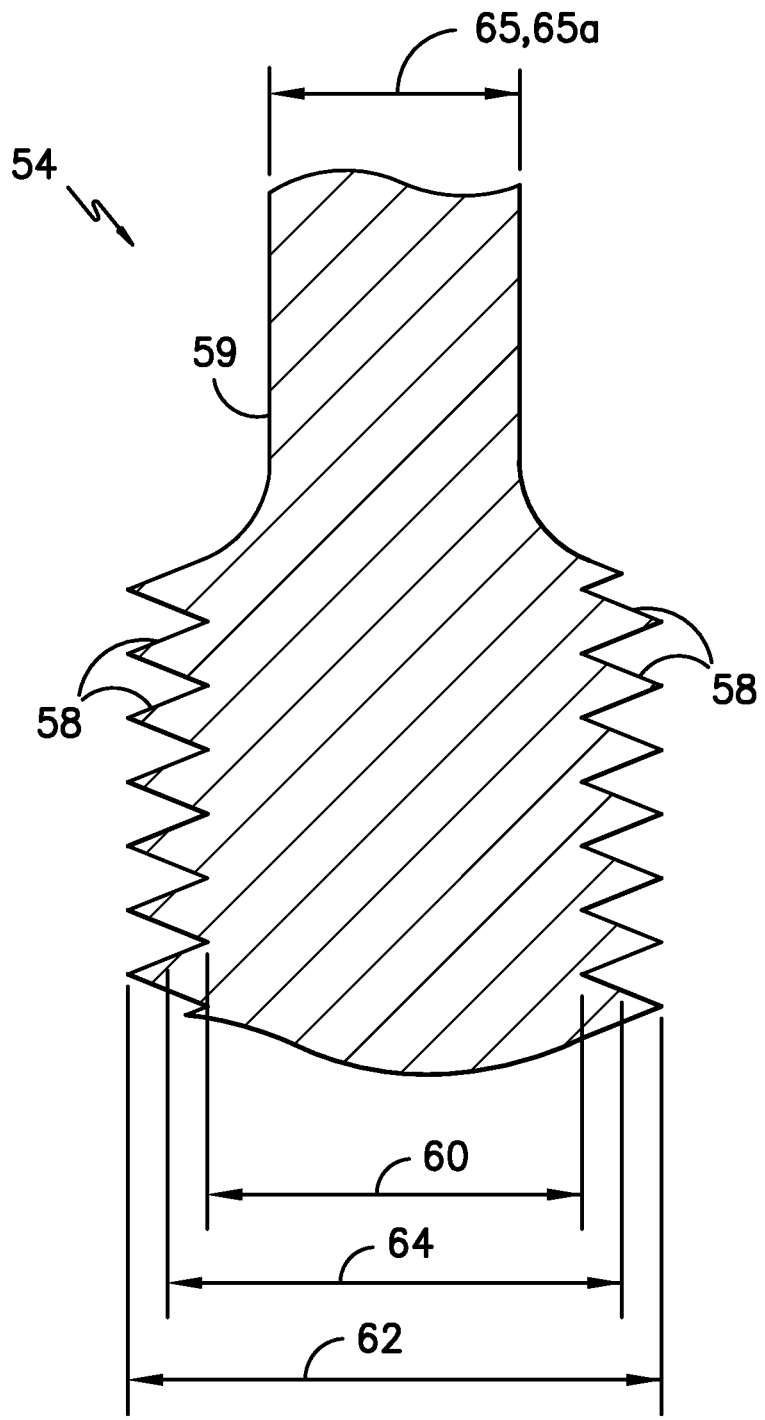
FIG. -7-

VARIABLE BOLT PARAMETERS FOR A WIND TURBINE ROTOR BLADE

FIELD OF THE INVENTION

The present subject matter relates generally to wind turbines and, more particularly, to a rotor blade including bolts having one or more variable bolt parameters (e.g., variable bolt diameters and/or variable circumferential spacing).

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During the operation of a wind turbine, each rotor blade is subjected to deflection and/or twisting due to the aerodynamic wind loads acting on the blade, which results in various reaction loads being transmitted through the blade root and into the wind turbine hub via the root bolts coupled between the blade root and the hub. For example, fatigue loads are often transmitted through the blade root along an edgewise direction of the rotor blade while highest extreme blade bending loads are often transmitted through the blade root along a flapwise direction of the rotor blade. As a result, the bolts located along the edgewise portions of the blade root are subjected to different load conditions than the bolts located along the flapwise portions of the blade root. However, conventional rotor blades typically include bolts installed at the blade root that have uniform/constant bolt parameters (e.g., constant bolt diameters and constant circumferential spacing around the blade root). As such, the blade root/bolts must be overdesigned to accommodate the differing load conditions experienced around the circumference of the blade root.

Accordingly, a rotor blade including bolts having one or more bolt parameters that are specifically tailored to accommodate the differing load conditions experienced around the circumference of the blade root would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade for a wind turbine. The rotor blade may include a body extending lengthwise between a blade root and a blade tip. The body may include a pressure side and a suction side extending between a leading edge and a trailing edge. In addition, the rotor blade may include a plurality of bolts extending from the blade root. A bolt parameter of the bolts may be varied for at least two of the bolts based on the loads transmitted through the blade root.

In another aspect, the present subject matter is directed to a rotor blade for a wind turbine. The rotor blade may include a body extending lengthwise between a blade root and a blade tip. The body may include a pressure side and a suction side extending between a leading edge and a trailing edge. In addition, the rotor blade may include a plurality of bolts extending from the blade root. A bolt diameter of the bolts may be varied for at least two of the bolts.

In a further aspect, the present subject matter is directed to a rotor blade for a wind turbine. The rotor blade may include a body extending lengthwise between a blade root and a blade tip. The body may include a pressure side and a suction side extending between a leading edge and a trailing edge. In addition, the rotor blade may include a plurality of bolts extending from the blade root. A circumferential spacing of the bolts may be varied around at least a portion of a circumference of the blade root.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective view of one embodiment of a rotor blade in accordance with aspects of the present subject matter;

FIG. 3 illustrates a root-end view of the rotor blade shown in FIG. 2, particularly illustrating one embodiment of the rotor blade including bolts having variable bolt diameters;

FIG. 4 illustrates another root-end view of the rotor blade shown in FIG. 2, particularly illustrating one embodiment of the rotor blade including bolts having variable circumferential spacing;

FIG. 5 illustrates a further root-end view of the rotor blade shown in FIG. 2, particularly illustrating one embodiment of the rotor blade including bolts having both variable bolt diameters and variable circumferential spacing;

FIG. 6 illustrates a partial, cross-sectional view of a bolt, particularly illustrating the various bolt diameters defined by the bolt; and FIG. 7 illustrates a partial, cross-sectional view of another bolt, particularly illustrating the bolt having a smaller shank diameter than the bolt shown in FIG. 6.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a rotor blade including bolts having one or more variable bolt parameters. Specifically, in several embodiments, the bolt parameter(s) may be varied to accommodate the varying load conditions present at different locations around the circumference of the blade root. For instance, in several embodiments, the diameter of each bolt may be selected based on the type of load transmitted through the blade root at the specific circumferential location of such bolt. For example, smaller bolt shank diameters may allow for the bolts to be more fatigue resistant while larger bolt shank diameters may allow for the bolts to have increased extreme bending load capabilities. Thus, in a particular embodiment, bolts with smaller shank diameters may be positioned along the portions of the blade root that are subjected to fatigue loads (e.g., the edgewise portions of the blade root) and bolts with larger shank diameters may be positioned along the portions of the blade root that are subjected to bending loads (e.g., the flapwise portions of the blade root). Such tailoring of the bolt diameters based on the specific loading conditions of the blade root may generally allow for a smaller, cheaper blade root to be designed and/or allow for a heavier blade to be supported.

In other embodiments, the circumferential spacing of the bolts may be varied based on the differing load conditions of the blade root. For example, in one embodiment, the circumferential spacing of the bolts may be largest along the portions of the blade root experiencing the lowest loads while the circumferential spacing of the bolts may be smallest along the portions of the blade root experiencing the highest loads. Such tailoring of the circumferential spacing of the bolts may generally allow for the total number of bolts needed to support the loads transmitted through the blade root to be reduced, thereby reducing the overall cost of the blade root.

Referring now to the drawings, FIG. 1 illustrates perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22.

Additionally, the wind turbine 10 may also include a turbine control system or turbine controller 24 centralized within the nacelle 16. However, it should be appreciated that the turbine controller 24 may be disposed at any location on or in the wind turbine 10, at any location on the support surface 14 or generally at any other location. The turbine controller 24 may be configured to control the various operating modes (e.g., start-up or shut-down sequences) and/or the components of the wind turbine 10. For example, the turbine controller 24 may be configured to transmit suitable control signals to a pitch controller 26 mounted within the rotor hub 20 for controlling the blade pitch or pitch angle of each rotor blade 22 (i.e., an angle that determines a perspective of the blade 22 with respect to the direction 28 of the wind). As is generally understood, the pitch angle may be adjusted about a pitch axis 30 of each rotor blade 22 in order to control the loads acting on the blades 22 (i.e., by adjusting an angular position the rotor blades 22 relative to the wind). Thus, in several embodiments, the pitch controller 26 may control the loads acting on the rotor blades 22 by transmitting suitable control signals to a pitch adjust mechanism (not shown) of each rotor blade 22.

Referring now to FIG. 2, a perspective view of one of the rotor blades 22 shown in FIG. 1 is illustrated in accordance with aspects of the present subject matter. As shown, the rotor blade 22 includes a blade root 32 configured for mounting the rotor blade 22 to the hub 20 of a wind turbine 10 (FIG. 1) and a blade tip 34 disposed opposite the blade root 32. A blade body 36 of the rotor blade 22 may extend lengthwise between the blade root 32 and the blade tip 34 and may generally serve as the outer shell of the rotor blade 22. As is generally understood, the blade body 36 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the blade body 36 may generally include a pressure side 38 and a suction side 40 extending between a leading edge 42 and a trailing edge 44. Additionally, the rotor blade 22 may have a span 46 defining the total length of the blade body 36 between the blade root 32 and the blade tip 34 and a chord 48 defining the total length of the blade body 36 between the leading edge 42 and the trailing edge 44. As is generally understood, the chord 48 may vary in length with respect to the span 46 as the blade body 36 extends from the blade root 32 to the blade tip 34.

Moreover, as shown, the rotor blade 22 may also include a plurality of T-bolts or root attachment assemblies 50 for coupling the blade root 32 to the hub 20 of the wind turbine 10. In general, each root attachment assembly 50 may include a barrel nut 52 mounted within a portion of the blade root 32 and a bolt 54 coupled to and extending from the barrel nut 52 so as to project outwardly from a root end 56 of the blade root 32. By projecting outwardly from the root end 56, the bolts 54 may generally be used to couple the blade root 32 to the hub 20. For example, as is generally understood, the bolts 54 may be configured to be received within and mounted to a pitch bearing (not shown) of the wind turbine 10, with such pitch bearing being mounted, in turn, to the wind turbine hub 20.

As described above, during operation of the wind turbine 10, aerodynamic wind loads acting on the rotor blade 22 may be transmitted through the blade root 32 and into the hub 20 via the bolts 54. As a result, the bolts 54 may be subjected to various different types of load conditions. For example, the bolts 54 may be subjected to blade fatigue loads acting about a bending axis in a chordwise or edgewise direction (indicated by arrow 55) of the rotor blade 22 (i.e., a direction extending between the leading and trailing edges 42, 44 of the rotor blade 22). In addition, the bolts 54 may be subjected to blade extreme bending loads acting on an axis in the flapwise direction (indicated by arrow 57) of the rotor blade 22 (i.e., a direction perpendicular to the edgewise direction that extends generally from the pressure side 38 to the suction side 40 of the rotor blade 22).

Referring now to FIG. 3, a root end view of the blade root 32 shown in FIG. 2 is illustrated in accordance with aspects of the present subject matter, with the bolts 54 being cut-off at the root end 56 of the blade root 32 for purposes of illustration. As shown in FIG. 3, in several embodiments, the blade root 32 may include a plurality of bolts 54 installed therein having variable bolt diameters.

It should be appreciated that, as used herein, the term "bolt diameter" may refer to a thread diameter and/or to a shank diameter of the bolts 54. The term "thread diameter" may further refer to a minor diameter, a major diameter and/or a pitch diameter of the bolts 54. For example, FIG. 6 illustrates a partial, cross-sectional view of a root bolt 54 having threads 58 defining a minor diameter 60, a major diameter 62 and a pitch diameter 64 and a shank 59 defining a shank diameter 65. As shown, the minor diameter 60 may generally be defined by the portion of the bolt 54 extending between the opposed valleys of the threads 58 and, thus, corresponds to the smallest diameter of the threads 58. Alternatively, the major diameter 62 may generally be defined between the opposed peaks of the threads 58 and, thus, corresponds to the largest diameter of the threads 58. Additionally, as shown in FIG. 6, the pitch diameter 64 (also referred to as the mean diameter) may be defined between the minor and major diameters 60, 62 and may generally correspond to the diameter at which each pitch is equally divided between the mating male and female threads. Moreover, the shank diameter 65 may generally correspond to the diameter of the shank 59 of the bolt 54 (i.e., the non-threaded portion of the bolt 54).

Referring back to FIG. 3, in several embodiments, two or more of the bolts 54 used to couple the rotor blade 22 to the wind turbine hub 20 may define varying shank diameters 65. For instance, as shown in the illustrated embodiment, a first portion of the bolts 54 may each define a first shank diameter (indicated by the hatched circle 65a) while a second portion of the bolts 54 may each define a second shank diameter (indicated by the hatched circle 65b), with the first shank diameter 65a being smaller than the second shank diameter 65b. In such an embodiment, the specific circumferential location at which each bolt 54 is installed may be selected based on the differing load conditions experienced around the circumference of the blade root 32. For example, the small shank diameters may make the threaded portions of the bolts 54 more resistant to the fatigue loads transmitted through the blade root 32 in the edgewise direction 55. Thus, as shown in FIG. 3, the bolts 54 defining the smaller shank diameters 65a may be installed along the edgewise portions 66 of the blade root 32 (i.e., those portions disposed at and/or adjacent to the intersection of the edgewise axis 55 with the blade root 32). Similarly, bolts 54 with large shank diameters may be more equipped to handle the extreme bending loads transmitted through the blade root 32 in the flapwise direction 57. Thus, as shown in FIG. 3, the bolts 54 defining the larger shank diameters 65b may be installed along the flapwise portions 68 of the blade root 32 (i.e., those portions disposed at and/or adjacent to the intersection of the flapwise axis 57 with the blade root 32).

It should be appreciated that the shank diameters 65a, 65b selected for the bolts 54 may generally vary across any suitable range. However, in several embodiments, the shank diameters 65a, 65b may vary between a diameter ranging from about 50% of the minor diameter 60 of the threads 58 to about 100% of the minor diameter of the threads 58, such as from about 60% of the minor diameter 60 to about 100% of the minor diameter 60 or from about 70% of the minor diameter 60 to about 90% of the minor diameter 60 and all other subranges therebetween. For example, as shown in FIG. 6, the shank diameter 65 may be generally equal to minor diameter 60, which may represent a larger shank diameter 65b for the bolts 54. Alternatively, as shown in FIG. 7, the shank diameter 65 may be significantly smaller than the minor diameter 60 (e.g., down to 50% of the minor diameter 60), which may represent a smaller shank diameter 65a for the bolts 54.

It should also be appreciated that, although FIG. 2 only depicts bolts 54 defining two different shank diameters 65a, 65b, the disclosed rotor blade 22 may generally include bolts 54 defining any number of different shank diameters 65. For example, in one embodiment, the shank diameters 65 of the bolts 54 may be progressively decreased or increased as the bolts 54 are positioned closer to the locations around the circumference of the blade root 32 at which the fatigue loads or extreme bending loads, respectively, are highest.

Additionally, in several embodiments, when the shank diameters 65a, 65b of the bolts 54 are being varied, the thread diameters 60, 62, 64 of the bolts 54 may be maintained constant. For example, as shown in FIG. 3, the major diameter 62 (shown by the dashed circle) is the same for each bolt 54. Alternatively, one or more of the thread diameters 60, 62, 64 may be varied together with the shank diameters 65 or in any another suitable combination. For example, in one embodiment, one or more of the thread diameters 60, 62, 64 may be varied while the shank diameters 65 are maintained constant.

It should also be appreciated that, when the shank diameters 65a, 65b of the bolts 54 are being varied, it may be desirable to vary the pitch of the threads 58 so that each bolt 54 may be properly tensioned within the blade root 32.

Moreover, it should be appreciated that, in alternative embodiments, the different sized bolts 54 may be positioned around the circumference of the blade root 32 at any other suitable locations. For example, instead of positioning the bolts 54 based on the locations of the different loads transmitted through the blade root 54, the different sized bolts 54 may be installed randomly at different locations around the circumference of blade root 32.

Referring now to FIG. 4, another root end view of the blade root 32 shown in FIG. 2 is illustrated in accordance with aspects of the present subject matter. As shown in FIG. 4, as an alternative to varying the bolt diameter(s) 60, 62, 64, 65, the bolts 54 may be configured to have variable circumferential spacing 70 (defined as the angular spacing between the center of two adjacent bolts 54) around at least a portion of the circumference of the blade root 32. In such an embodiment, the specific circumferential spacing 70 defined between any two adjacent bolts 54 may be selected based on the magnitude of the loads transmitted through the blade root 32 at such location. For example, the blade root 32 may include various high load regions 72 at which the loads transmitted through the blade root 32 are relatively high or extreme, such as the edgewise portions 66 of the blade root 32 experiencing high fatigue loads and/or the flapwise portion 68 of the blade root 32 experiencing high compressive bending loads (i.e., the portion of the blade root 32 aligned with the suction side 40 of the rotor blade 22). Thus, as shown in FIG. 4, the circumferential spacing 70 of the bolts 54 located within the high load regions 72 may be relatively small, thereby allowing for a larger number of bolts 54 to be installed within such regions 72 to accommodate the higher loads. Similarly, the blade root 32 may also include various low load regions 74 at which the loads transmitted through the blade root are significantly lower than in the high load regions 72. As such, the circumferential spacing 70 of the bolts 54 located within the low load regions 74 may be increased since fewer bolts 54 may be required within such regions 72 to accommodate the lower loads.

It should be appreciated that the amount of variance in the circumferential spacing 70 of the bolts 54 may generally depend on the size of the blade root 32 and/or the number of bolts 54 installed within the blade root 32. However, in several embodiments, the circumferential spacing 70 of the bolts 54 may generally be varied from about 2 degrees to about 36 degrees, such as from about 2.5 degrees to about 30 degrees or from about 3 degrees to about 15 degrees or from about 3.5 degrees to about 7 degrees and all other subranges therebetween.

It should also be appreciated that, in alternative embodiments, the circumferential spacing 70 of the bolts 54 may be varied without consideration of the location and/or magnitude of the loads transmitted through the blade root 32. For example, in one embodiment, the circumferential spacing 70 of the bolts 54 may be varied randomly around the circumference of the blade root 32.

Additionally, it should be appreciated that, in further embodiments of the present subject matter, the bolts 54 may be configured to have both varied bolt diameter(s) 60, 62, 64, 65 and varied circumferential spacing 70. For example, FIG. 5 illustrates one example of how both the bolt diameters(s) 60, 62, 64, 65 and the circumferential spacing 70 of the bolts may be varied around the circumference of the blade root 32. As shown in FIG. 5, the bolts 54 disposed along the edgewise portions 66 of the blade root 32 may be configured to define smaller shank diameters 65a and may have a smaller circumferential spacing 70 in order to accommodate the high fatigue loads experienced along such portions 66 of the blade root 32. Similarly, the bolts 54 disposed along the flapwise portion 68 of the blade root 32 aligned with the suction side 40 of the rotor blade 22 may be configured to define larger shank diameters 65b and may have a smaller circumferential spacing 70 to accommodate the high, compressive bending loads experienced along such portion 78 of the blade root 32. Moreover, as shown in FIG. 5, since the remainder of the blade root 32 is generally subjected to lower loads, the bolts 54 positioned along such low load regions 74 may have significantly larger circumferential spacing 70 and may define any suitable thread diameter 65.

Of course, it should be appreciated that, in alternative embodiments, the bolts diameters 60, 62, 64, 65 and the circumferential spacing 70 of the bolts 54 may be varied in any other suitable manner, such as by varying both the bolts diameters 60, 62, 64, 65 and the circumferential spacing 70 of the bolts 54 without consideration of the loads acting on the blade root 32.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, the rotor blade comprising:
    a body extending lengthwise between a blade root and a blade tip, the body including a pressure side and a suction side extending between a leading edge and a trailing edge; and
    a plurality of bolts extending from the blade root, wherein a bolt parameter of the plurality of bolts is varied for at least two of the bolts based on loads transmitted through the blade root,
    wherein the bolt parameter comprise both a bolt diameter and a circumferential spacing the plurality of bolts.

2. The rotor blade of claim 1, wherein the bolt diameter comprises at least one of a minor diameter, a major diameter, a pitch diameter or a shank diameter of the plurality of bolts.

3. The rotor blade of claim 1, wherein the plurality of bolts includes a first plurality of bolts defining a first shank diameter and a second plurality of bolts defining a second shank diameter, wherein the first shank diameter is smaller than the second shank diameter.

4. The rotor blade of claim 3, wherein the first plurality of bolts are disposed along edgewise locations of the blade root and the second plurality of bolts are disposed along flapwise locations of the blade root.

5. The rotor blade of claim 1, wherein the blade root includes at least one high load region and at least one low load region, the circumferential spacing of the plurality of bolts disposed along the at least one high load region being smaller than the circumferential spacing of the plurality of bolts disposed along the at least one low load region.

6. The rotor blade of claim 1, wherein the circumferential spacing ranges from about 2 degrees to about 36 degrees.

7. A rotor blade for a wind turbine, the rotor blade comprising:
    a body extending lengthwise between a blade root and a blade tip, the body including a pressure side and a suction side extending between a leading edge and a trailing edge; and
    a plurality of bolts extending from the blade root, the plurality of bolts including a first plurality of bolts defining a first shank diameter and a second plurality of bolts defining a second shank diameter, the first shank diameter being smaller than the second shank diameter,
    wherein the first plurality of bolts are disposed along edgewise locations on the blade root and the second plurality of bolts are disposed along flapwise locations on the blade root.

8. The rotor blade of claim 7, wherein the bolt diameter is varied based on loads transmitted through the blade root.

9. The rotor blade of claim 7, wherein a circumferential spacing of the plurality of bolts is also varied around at least a portion of a circumference of the blade root.

10. A rotor blade for a wind turbine, the rotor blade comprising:
    a body extending lengthwise between a blade root and a blade tip, the body including a pressure side and a suction side extending between a leading edge and a trailing edge; and
    a plurality of bolts extending from the blade root, wherein a circumferential spacing of the plurality of bolts is varied around at least a portion of a circumference of the blade root.

11. The rotor blade of claim 10, wherein the blade root includes at least one high load region and at least one low load region, the circumferential spacing of the plurality of bolts at the at least one high load region being smaller than the circumferential spacing of the plurality of bolts at the at least one low load region.

12. The rotor blade of claim 10, wherein the circumferential spacing ranges from about 2 degrees to about 36 degrees.

13. The rotor blade of claim 12, wherein the circumferential spacing ranges from about 3.5 degrees to about 7 degrees.

14. The rotor blade of claim 10, wherein a bolt diameter of the plurality of bolts is also varied for at least two of the bolts.

* * * * *